(12) United States Patent
Heinzen et al.

(10) Patent No.: US 8,679,665 B2
(45) Date of Patent: Mar. 25, 2014

(54) BATTERY FOR A POWER TOOL

(75) Inventors: William J. Heinzen, Glenview, IL (US); Robert L. Turk, Waukegan, IL (US); Robert Meyer, Palatine, IL (US)

(73) Assignee: Illinois Tool Works Inc., Glenview, IL (US)

(*) Notice: Subject to any disclaimer, the term of this patent is extended or adjusted under 35 U.S.C. 154(b) by 874 days.

(21) Appl. No.: 11/953,577

(22) Filed: Dec. 10, 2007

(65) Prior Publication Data

US 2009/0148755 A1 Jun. 11, 2009

(51) Int. Cl.
*H01M 10/48* (2006.01)
*H01M 2/02* (2006.01)

(52) U.S. Cl.
USPC .......... 429/97; 429/62; 429/65; 429/90; 429/96; 429/99; 429/100; 429/121; 429/123; 429/163

(58) Field of Classification Search
USPC .......... 429/90, 96–100, 62, 65, 121, 123, 163
See application file for complete search history.

(56) References Cited

U.S. PATENT DOCUMENTS

| | | | |
|---|---|---|---|
| 4,403,722 A | 9/1983 | Nikolich | |
| 4,483,473 A | 11/1984 | Wagdy | |
| 4,483,474 A | 11/1984 | Nikolich | |
| 4,522,162 A | 6/1985 | Nikolich | |
| 5,716,730 A * | 2/1998 | Deguchi | 429/97 |
| 6,051,334 A * | 4/2000 | Tsurumaru et al. | 429/97 |
| 6,176,412 B1 | 1/2001 | Weinger et al. | |
| 7,531,268 B2 * | 5/2009 | Huang | 429/97 |
| 2004/0020670 A1* | 2/2004 | Kusmierski et al. | 173/217 |
| 2005/0130034 A1 | 6/2005 | Buck et al. | |
| 2005/0218868 A1 | 10/2005 | Phillips et al. | |
| 2006/0222931 A1* | 10/2006 | Lin | 429/100 |
| 2007/0077486 A1* | 4/2007 | White et al. | 429/97 |
| 2007/0193762 A1* | 8/2007 | Arimura et al. | 173/217 |
| 2007/0243458 A1* | 10/2007 | Roehm et al. | 429/96 |
| 2008/0083252 A1* | 4/2008 | Cho | 70/207 |

* cited by examiner

*Primary Examiner* — Ula C Ruddock
*Assistant Examiner* — Amanda Barrow
(74) *Attorney, Agent, or Firm* — Greer, Burns & Crain, Ltd.; Maurice E. Finnegan, III; Mark W. Croll

(57) ABSTRACT

A battery for use in a power tool, including a battery housing, at least one battery cell in the battery housing, a pivoting member at least partially enclosed within the battery housing which moves between a latched position and an unlatched position, and a biasing device associated with the pivoting member for urging the pivoting member towards the latched position.

7 Claims, 3 Drawing Sheets

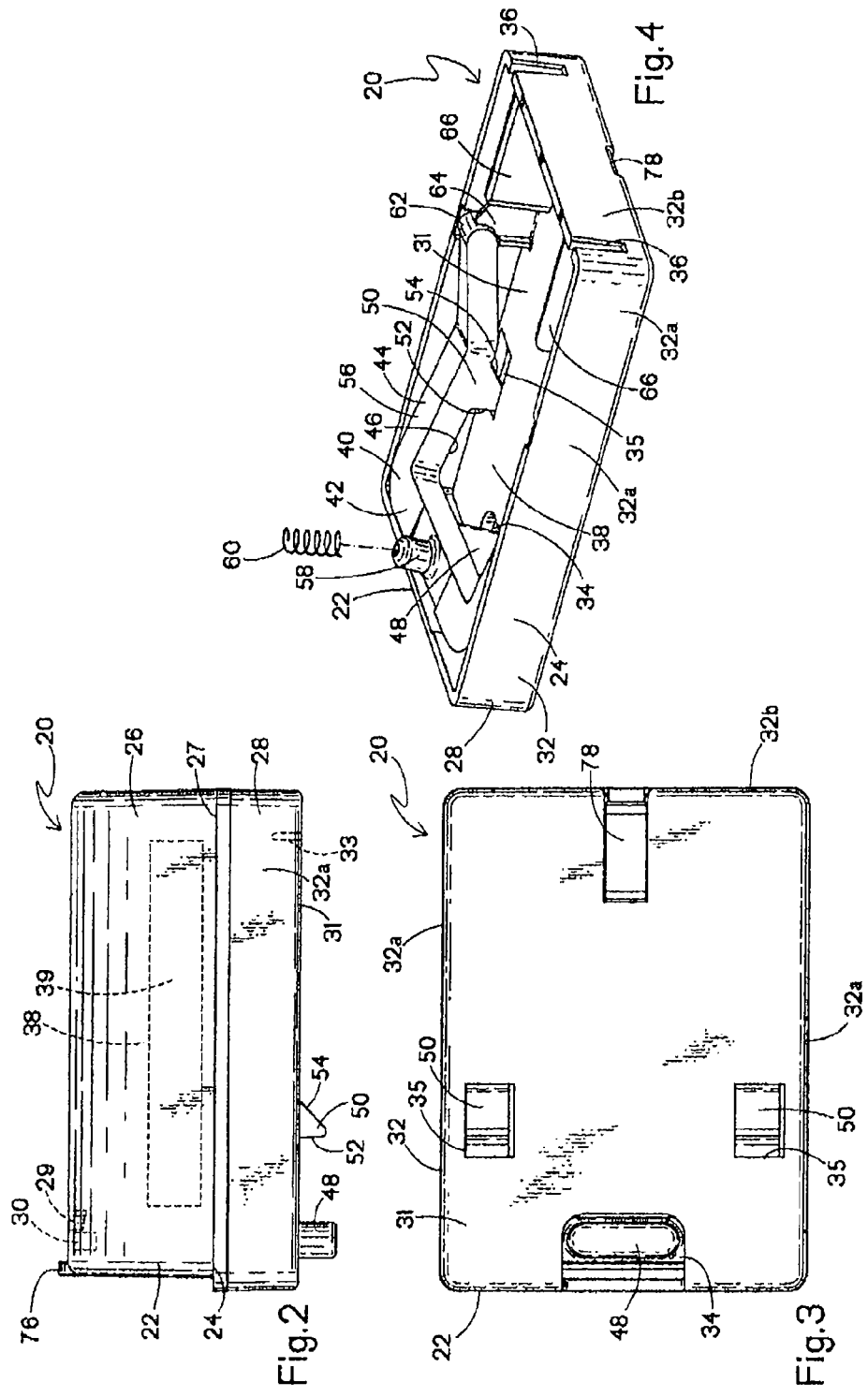

BATTERY FOR A POWER TOOL

BACKGROUND OF THE INVENTION

The present invention relates generally to power tools employing batteries to power various tool functions, and more specifically to a battery for such a tool.

A preferred type of tool suitable with the present invention is portable, such as a combustion-powered fastener driving tool, also commonly referred to as a combustion tool or combustion nailer. Tools of this kind are manufactured by Illinois Tool Works, Inc. of Glenview, Ill. and are described in commonly assigned patents U.S. Pat. Nos. 4,522,162; 4,483,473; 4,483,474; 4,403,722 and 6,176,412, all of which are incorporated by reference herein.

Generally, such combustion tools incorporate a housing enclosing a small internal combustion engine. The engine is powered by a canister of pressurized fuel gas, also called a fuel cell. A powerful, battery-powered electronic power distribution unit produces the spark for ignition, and a fan located in the combustion chamber provides both an efficient combustion within the chamber, and facilitates scavenging, including the exhaust of combustion by-products. The engine includes a reciprocating piston with an elongate, rigid driver blade disposed within a cylinder. Such tools include electronic control systems, spark generators, electric fan motors, and other electronic components, and are powered by batteries.

Conventional power tool batteries are preferably rechargeable and are configured for releasably locking into place when electronically connected to a corresponding power tool. This locking engagement facilitates operation of the tool when subject to environmental stress and operational shock impacts that potentially cause disconnection and/or power disruption. Thus, one design criteria of such batteries is the ability to maintain the electrical connection while withstanding environmental stress and operational shock impact forces to which such tools are exposed.

To address this design objective, conventional batteries include a latch element releasably engaging a corresponding opening in the tool, locking the battery in place. An actuator button is associated with the latch for removing the battery from the tool. The latch element and the actuator button are disposed in close proximity to each other so that when the actuator button is depressed, the latch element also moves in the same direction. When the actuator button is sufficiently depressed, the latch element disengages from a corresponding latch-receiving opening in the tool housing, releasing the battery.

In some cases and with some users, it has been difficult for users to depress the actuator button for releasing the battery. Thus, another design criteria for such batteries is ease of actuation.

BRIEF SUMMARY OF THE INVENTION

The present battery for a power tool features a separate pivoting member disposed within a housing of the battery. The separate pivoting member provides the user increased leverage over the position of the pivoting member such that the user may easily remove the battery from the tool upon depressing the actuator button. In addition, the battery is configured such that when the pivoting member is in the latched position, the battery is able to withstand operational shock impact forces.

More specifically, a battery is provided for use in a power tool, including a battery housing, at least one battery cell in the battery housing, a pivoting member at least partially enclosed within the battery housing, which moves between a latched position and an unlatched position, and a biasing device associated with the pivoting member for urging the pivoting member towards the latched position.

BRIEF DESCRIPTION OF THE SEVERAL VIEWS OF THE DRAWINGS

FIG. 2 is a right side view of the present battery;

FIG. 3 is a bottom view of the present battery;

FIG. 4 is a top perspective view of a lower section of the present battery with portions removed for clarity.

DETAILED DESCRIPTION OF THE INVENTION

Figure 1:
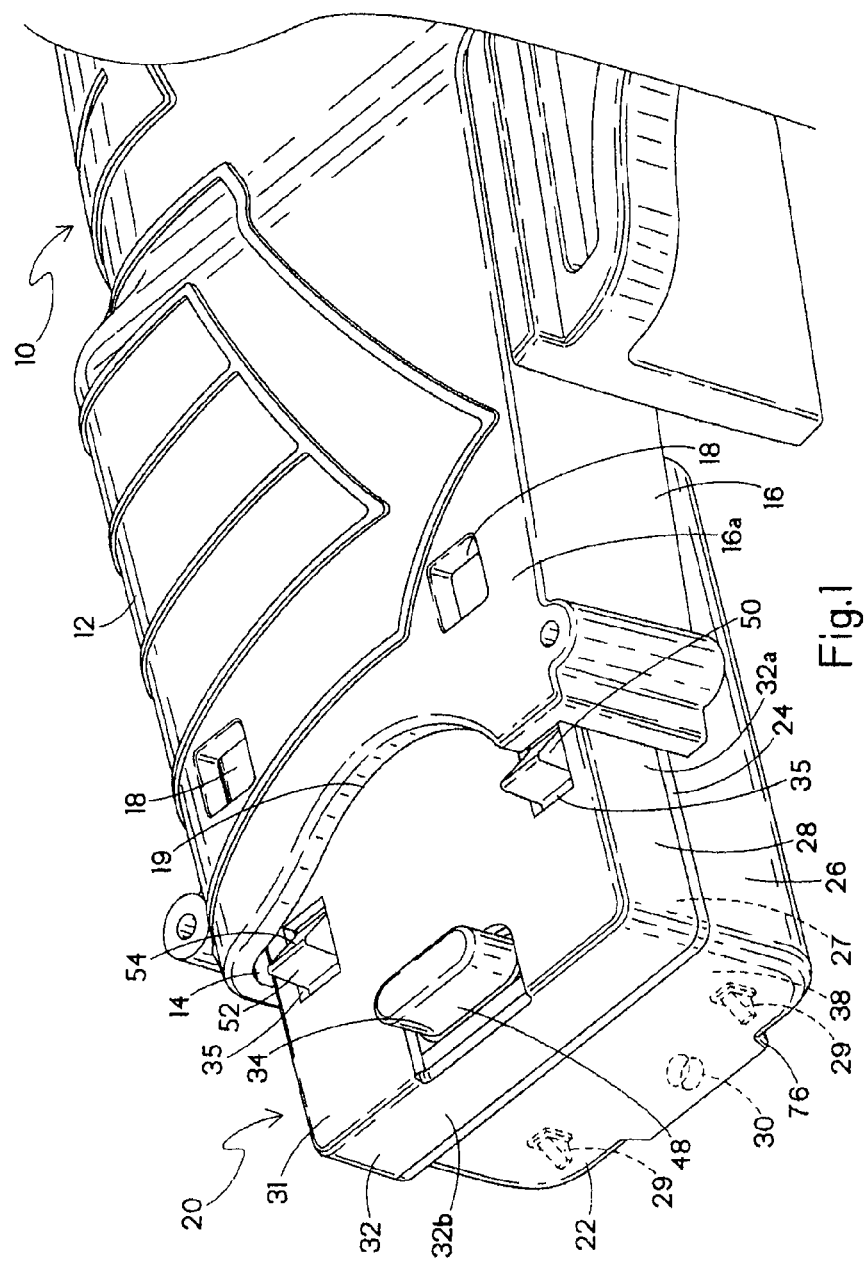
FIG. 1 is a fragmentary side perspective view of a power tool incorporating the present battery.

Referring now to FIGS. 1-3, a power tool is generally designated 10 and preferably is of the general type described in detail in the patents listed above and incorporated by reference in the present application. A tool housing 12 of the power tool 10 forms a tool chamber 14, the size and shape of the tool chamber being defined by tool housing walls 16. One of the tool housing walls 16a has at least one, but preferably two latch receiving openings 18 and a wall recessed area 19.

In the preferred embodiment, the tool chamber 14 receives a battery of the same general shape and size, generally designated 20, having a battery front end 22, a battery housing 24 including a battery housing top portion 26 and a battery housing bottom portion 28. The battery housing top portion 26 is generally box-shaped, defining a battery top portion open end 27. At least one, but preferably two battery cell front ribs 29 are disposed on the battery housing top portion 26 near the battery front end 22 (FIG. 2 shown hidden). A biasing member receiving device 30 (FIG. 1 shown hidden) is disposed in the battery housing top portion 26 adjacent the battery front end 22.

The battery housing bottom portion 28 is generally tray-shaped, having a battery housing bottom surface 31 and a peripheral battery bottom portion sidewall 32. At least one battery cell rear rib 33 is disposed on the battery housing bottom surface 31 opposite the battery front end 22 (FIG. 5).

A button opening 34 and at least one, but preferably two latch openings 35 are disposed on the battery housing bottom surface 31 (FIG. 3). In the preferred embodiment, the latch openings 35 are disposed along opposite elongated battery bottom portion sidewalls 32a of the battery housing bottom portion 28 and near the battery front end 22, with the button opening 34 generally centered on the battery housing bottom surface 31 at the battery front end 22. On a shorter battery bottom portion sidewall 32b of the battery housing bottom portion 28 opposite the battery front end 22, are two spaced, generally parallel socket grooves 36 (FIG. 4).

Both the battery housing top portion 26 and the battery housing bottom portion 28 are attached to each other using ultrasonic welding or a similar fastening technology including, but not limited to chemical adhesive, threaded fasteners, etc. Once joined, the battery housing portions 26, 28 define an internal battery chamber 38. At least one, but preferably as many as five battery cells 39 are disposed within the battery chamber 38 (FIG. 2 one cell shown hidden). In the preferred embodiment, the battery cells 39 are rechargeable Nickel Metal Hydride (NiMH) batteries, although any similar battery technology that provides power is considered suitable. It is preferred that the five battery cells 39 are disposed within the battery chamber 38 such that the battery cells 39 are associated and held in place by both the battery cell front ribs 29 and the battery cell rear rib 33.

Figure 5:
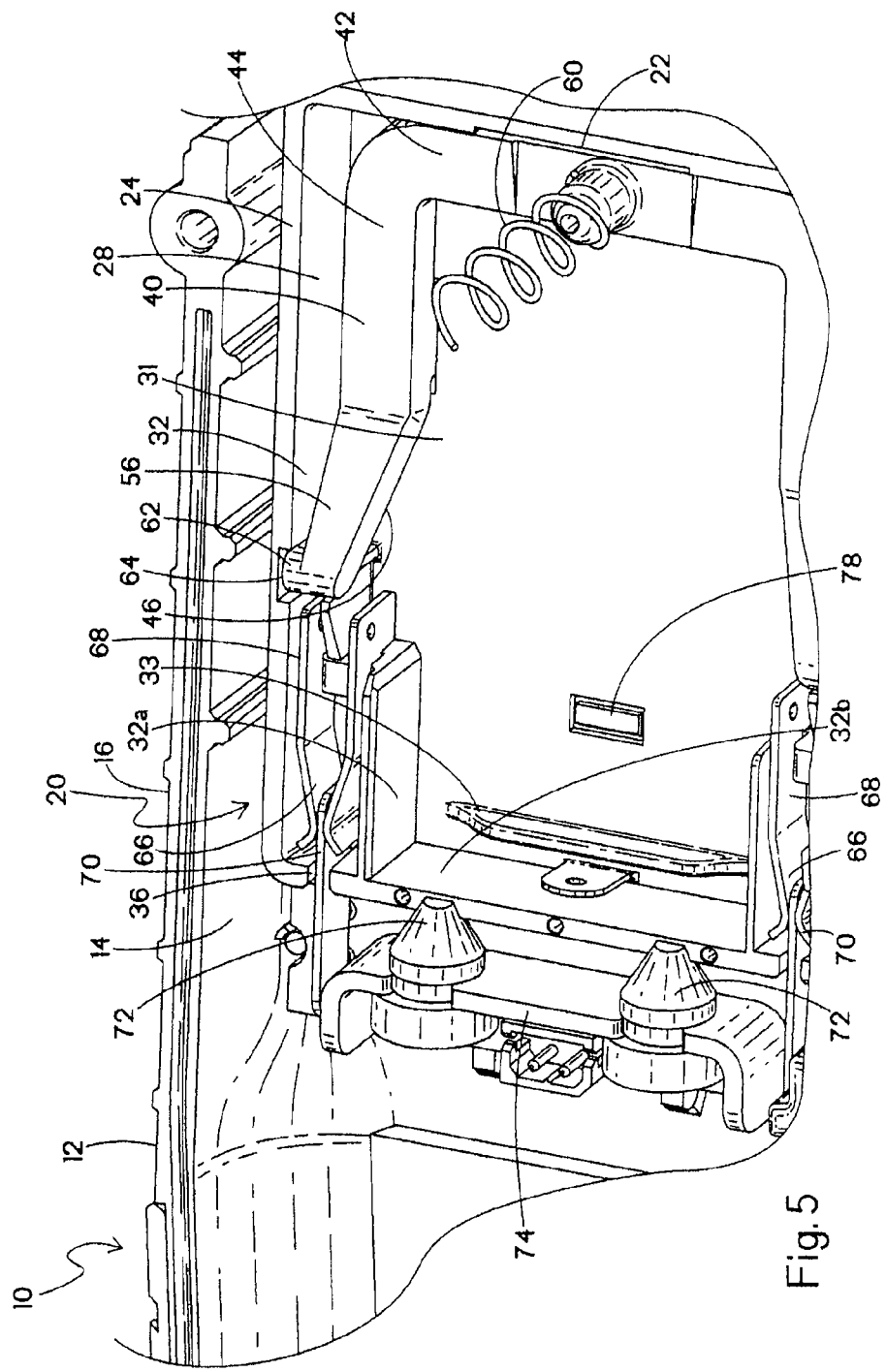
FIG. 5 is a top perspective view of the battery of FIG. 4, slightly rotated, with portions removed for clarity.

Referring now to FIGS. 1 and 4-5, the present battery 20 has a pivoting member 40 in the battery chamber 38, being at least partially enclosed within the battery housing 24. In the preferred embodiment, the pivoting member 40 is generally "U" shaped, having one pivoting member center section 42 located between and generally perpendicular or transverse to two generally parallel pivoting member legs 44. It is noted that other shapes are suitable depending on the application.

The pivoting member 40 has two sides, a pivoting member first side 46 facing an interior surface of the battery housing bottom surface 31 and having an actuator button 48, which preferably is on the pivoting member center section 42. Also, at least one and preferably two latch elements 50, preferably each on the corresponding pivoting member legs 44 are located on the pivoting member first side 46. A latch first side 52 faces the battery front end 22, and has a slope generally perpendicular to the battery housing bottom surface 31. A latch second side 54 is located opposite the first latch side, and has a sloping surface defining an obtuse angle relative to the battery housing bottom surface 31. It is preferred that the actuator button 48 extends farther beyond the button opening 34 than each latch element 50 extends beyond the corresponding latch opening 35. It is also preferred that the actuator button 48 has a surface area greater than a surface area of the latch element 50.

A pivoting member second side 56 has a biasing member formation 58 that in a preferred embodiment is a rounded peg shape. The biasing member formation 58 is associated with a spring 60, which is secured within the battery chamber 38 at the opposite end to the biasing member receiving device 30. It is noted that any biasing device known in the art is considered equivalent to the spring 60.

Referring now to FIGS. 4 and 5, at the end of each pivoting member leg 44 is a pivoting member leg extension 62, each being associated with a corresponding accommodating pivot point or socket 64. Two spaced terminal sockets 66 are defined on the battery bottom portion 28 in the battery chamber 38 and are each associated with the corresponding pivot point 64 and at the opposite end with the corresponding socket grooves 36. In a preferred embodiment, each terminal socket 66 is aligned with a corresponding pivot point 64 and a corresponding pivoting member leg 44. Each terminal socket 66 has a pair of terminals 68, each of the terminals being biased together at a contact point 70. It is preferred that the first terminal socket 66 is connected, as by soldering one of the terminals 68 to a positive lead of the battery cells 39 with a lead wire (not shown) and the second terminal socket 66 is similarly connected to a negative lead of the battery cells 39 with a second lead wire (not shown).

Referring now to FIG. 1, when the user inserts the battery 20 into the tool 10, the battery 20 is guided into the tool chamber 14 with the battery housing bottom surface 31 facing the tool housing wall 16a and the battery front end 22 being farthest from the tool chamber 14. Due to the biasing force exerted by the spring 60, the latch elements 50 extend though the latch openings 35, causing the latch second side 54 to make contact with an edge of the tool housing wall 16a. Initially, this contact prevents the battery 20 from moving further into the tool chamber 14. However, when the user exerts sufficient pressure on the battery 20 in the direction of the tool chamber 14, the sloping nature of the latch second side 54 engages the tool housing wall 16a, overcoming the biasing force of the spring 60, forcing the latch element 50 to retract. When the latch element 50 is sufficiently retracted, the battery 20 is able to move further into the tool chamber 14, during which each latch element 50 continues to press against the inside of the tool housing wall 16a.

Referring now to FIG. 5, when the battery 20 is completely inserted into the tool chamber 14, at least one, but preferably two resilient stop structures 72 engage the battery 20. The stop structures or bumpers 72 are secured to a bracket 74 in the tool chamber 14, preventing the battery 20 from moving beyond the preferred location and further provide shock absorption when the power tool 10 is in use.

When the battery 20 is fully inserted into the tool chamber 14, the wall recessed area 19 of the tool housing 12 provides a cutout to facilitate user access to the actuator button 48. Further, the latch elements 50 are aligned with the latch receiving openings 18, allowing the latch elements 50 to return from their recessed state and extend through the latch receiving openings by way of the biasing force of the spring 60. As a result, the battery 20 is in a releasably locked position, preventing it from being removed from the tool chamber 14. It will be appreciated that upon reaching the locked position, the battery 20 is in electrical contact with the tool 10, preferably through the terminal sockets 66, the terminals 68 and the associated socket grooves 36. A co-pending U.S. patent application Ser. No. 11/953,586 for a Power Tool Having a Mating Battery further describes the connection between the tool and the battery and is incorporated by reference herein.

As noted above, one design criteria of the battery 20 is the ability to withstand environmental stress and operational shock impact forces to which the tool 10 is exposed. The direction of motion resulting from the operational shock impact of the tool 10 generated by fastener driving is generally transverse to the direction of insertion of the battery 20. Therefore, the action of the latch elements 50, in cooperation with the stop structures 72, are also transverse to the shock impact and as such more securely retain the battery 20 within the tool chamber 14.

When the battery 20 requires removal, it is disengaged from the locked position by depressing the actuator button 48, causing the pivoting member 40 to rotate about the pivot points 64 such that the latch elements 50 recess. When the latch elements 50 are sufficiently recessed, the latch first side 52 no longer makes contact with the tool housing wall 16a, thus allowing the battery 20 to be removed from the tool chamber 14. A finger grip 76 (FIG. 2) is disposed on the battery housing top portion 26 near the battery front end 22 to assist the user in removing the battery 20.

It is well known in the art that rechargeable batteries can be charged using stand-alone battery chargers. However, it is also well known in the art that batteries should not be continuously charged once they have reached a certain temperature. Therefore, a temperature sensor (not shown) is disposed on the battery cells 39 as is known in the art. The sensor is connected, as by soldering to a negative lead of the battery cells 39 using a lead wire (not shown) and is also connected to a temperature contact 78 preferably located on the battery housing bottom surface 31. Preferably, the temperature contact 78 is centered on the battery housing bottom surface 31 near the end having the terminal sockets 66.

While a particular embodiment of the present battery for use in a power tool has been described herein, it will be appreciated by those skilled in the art that changes and modifications may be made thereto without departing from the invention in its broader aspects and as set forth in the following claims.

The invention claimed is:

1. A battery for use in a power tool, comprising:

a battery housing defining a longitudinal axis, an actuator opening and two latch openings and opposing sockets;

at least one battery cell in said battery housing;

a pivoting member at least partially enclosed within said battery housing and moving between a latched position and an unlatched position, said pivoting member including pivoting member legs that each have a first side, an opposing second side and an end, each of said ends including a leg extension that is pivotably connected to a respective one of said sockets so that said pivoting member pivots relative to said battery housing, said pivoting member including an actuator button and at least one latch element, said at least one latch element extending transversely from said first side of one of said legs, said actuator button being configured to project through said actuator opening and each said latch element being configured to project through an associated one of said at least two latch openings when said pivoting member is in said latched position; and a biasing device configured to engage said second side of said pivoting member for urging said pivoting member towards said latched position, wherein upon insertion of said battery housing into the tool, said battery housing is oriented so that said longitudinal axis is transverse to a direction of movement of the tool resulting from operational impact on the tool.

2. The battery of claim 1 further comprising a temperature sensor associated with said battery housing.

3. The battery of claim 1 wherein said second side includes a biasing member formation device, said biasing device being configured to engage said formation device.

4. The battery of claim 1 wherein said pivoting member is generally "U" shaped, having one pivoting member center section located between said legs, said pivoting member legs being generally perpendicular to said pivoting member center section.

5. The battery of claim 4 wherein said actuator button is located on said pivoting member center section and said at least one latch element is located on each said leg.

6. The battery of claim 3 wherein said actuator button is constructed and arranged to extend farther beyond a button opening than said at least one latch element extends beyond said at least one latch opening.

7. The battery of claim 6 wherein said actuator button has a larger total surface area than a total surface area of each said at least one latch element.

* * * * *